United States Patent [19]
Coleman

[11] Patent Number: 6,146,111
[45] Date of Patent: Nov. 14, 2000

[54] AUTOMOTIVE WATER PUMP

[75] Inventor: Richard Coleman, Menominee, Mich.

[73] Assignee: Coleman Machine, Inc., Menominee, Mich.

[21] Appl. No.: 09/193,167

[22] Filed: Nov. 16, 1998

[51] Int. Cl.$^7$ .............................. F04B 17/00; F16H 7/10
[52] U.S. Cl. ............................. 417/359; 417/66; 474/112
[58] Field of Search ............................. 417/359, 66, 67, 417/68; 474/112

[56] References Cited

U.S. PATENT DOCUMENTS

| | | | |
|---|---|---|---|
| 1,759,313 | 5/1930 | Jennings | 417/359 |
| 3,771,900 | 11/1973 | Baehr | 415/72 |
| 3,863,517 | 2/1975 | Pareja | 474/112 |
| 4,500,303 | 2/1985 | Sermersheim et al. | 474/112 |
| 4,504,252 | 3/1985 | Homma | 474/112 |
| 4,568,318 | 2/1986 | Johnson et al. | 474/112 |
| 4,637,780 | 1/1987 | Grayden | 417/68 |
| 4,822,321 | 4/1989 | Webb | 474/117 |
| 4,889,436 | 12/1989 | Lynn, Jr. | 384/447 |
| 5,558,587 | 9/1996 | Church | 474/112 |

*Primary Examiner*—Timothy S. Thorpe
*Assistant Examiner*—Michael K. Gray
*Attorney, Agent, or Firm*—Brian G. Gilpin; Godfrey & Kahn, S.C.

[57] ABSTRACT

A water pump allows adjustment of the drive belt by rotating a portion of the water pump housing. The water pump eliminates the need for additional drive-belt tensioning parts, therefore simplifying maintenance procedures. The pump housing has a support member mounted thereto, with a pump shaft extending therethrough. The support member flange includes eccentrically-formed mounting grooves. The support member is rotated by the loosening of adjustment screws securing it in place. By rotating the support member, the location of the pump shaft is re-oriented and the tension of the drive belt adjusted.

15 Claims, 5 Drawing Sheets

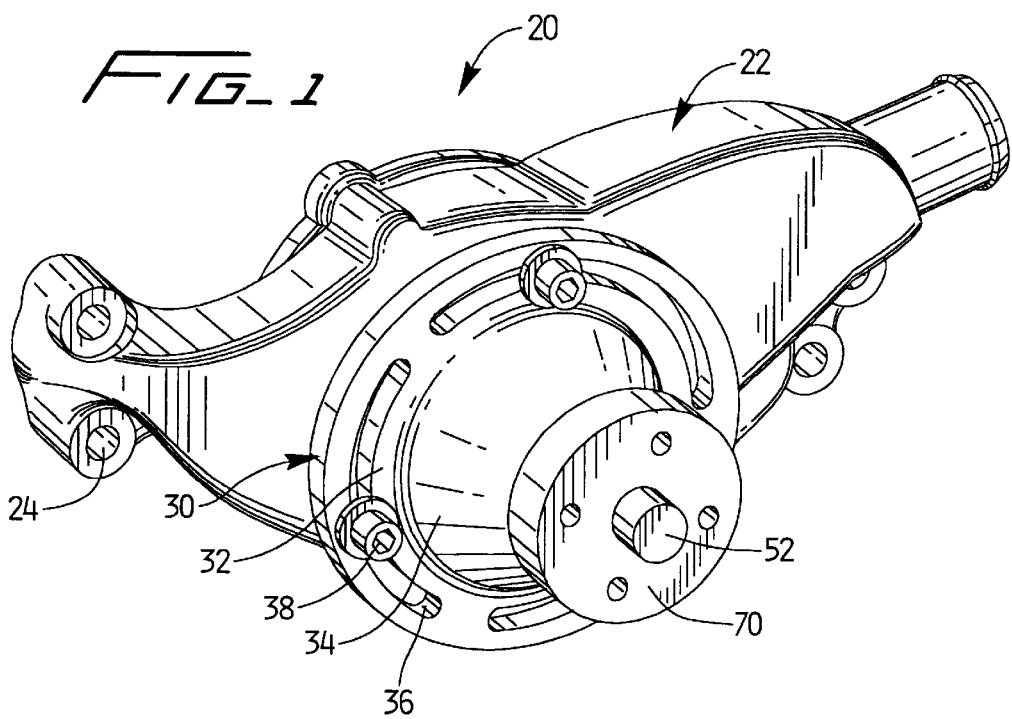
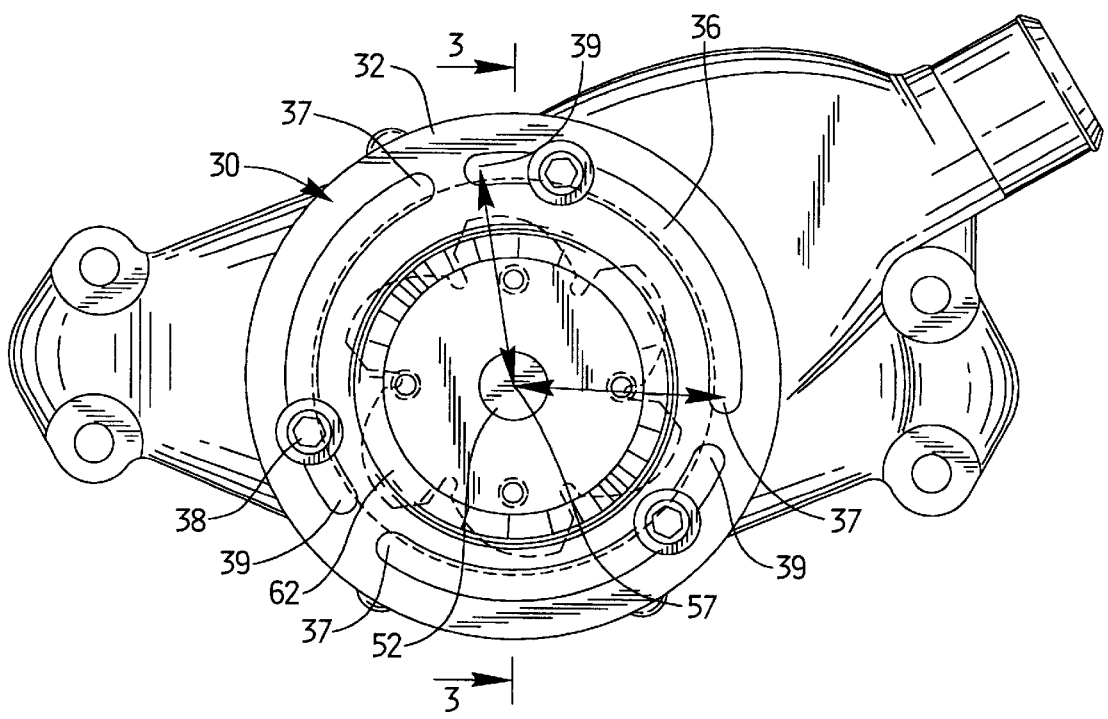

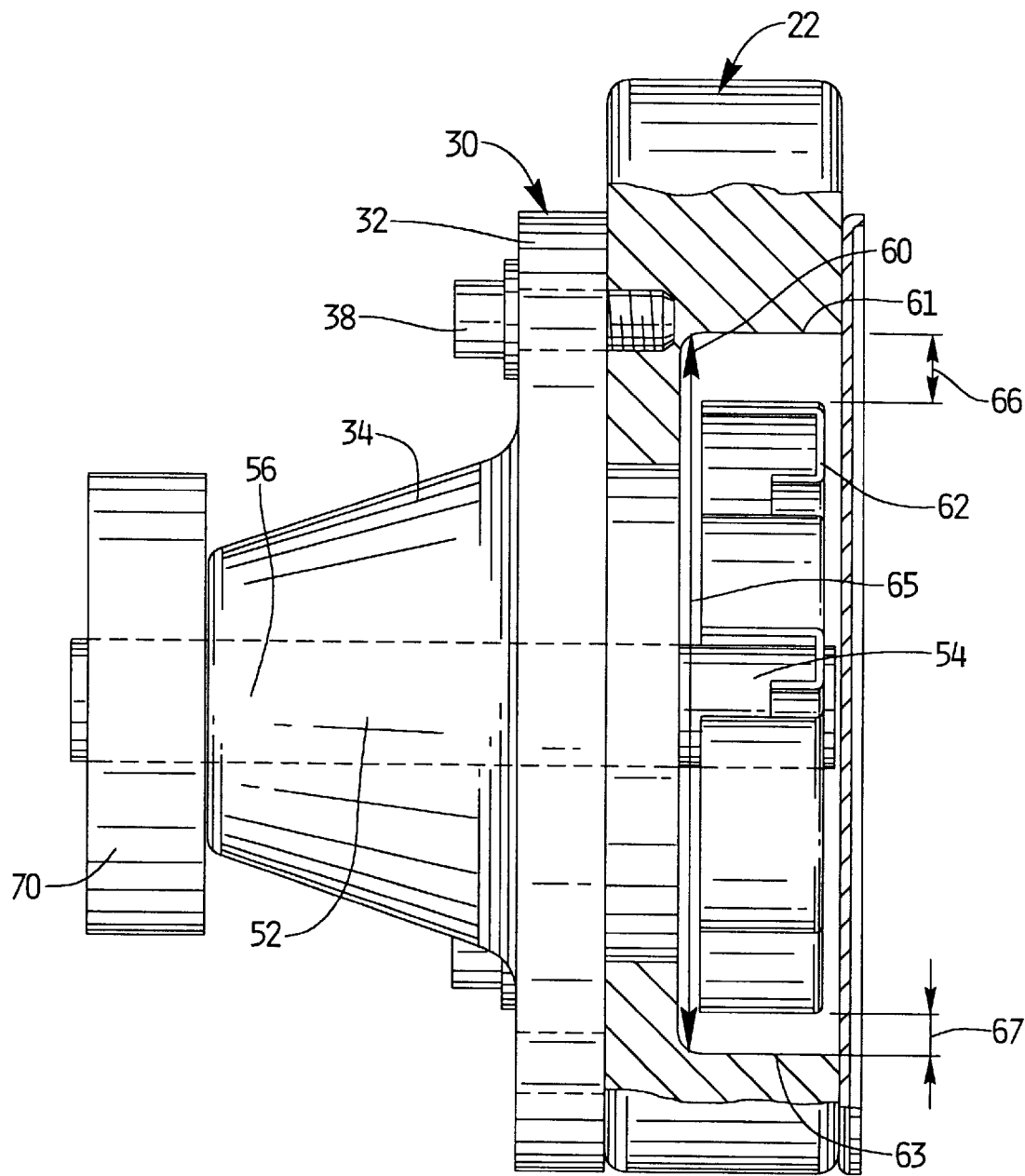
FIG_3

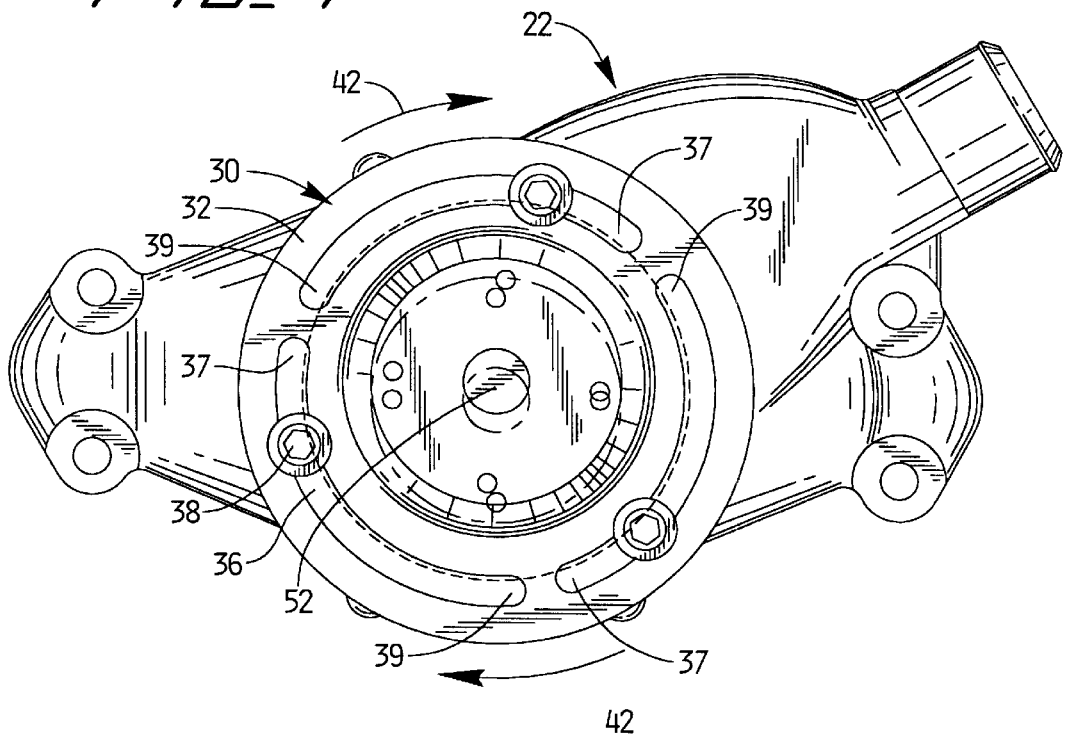
FIG_4
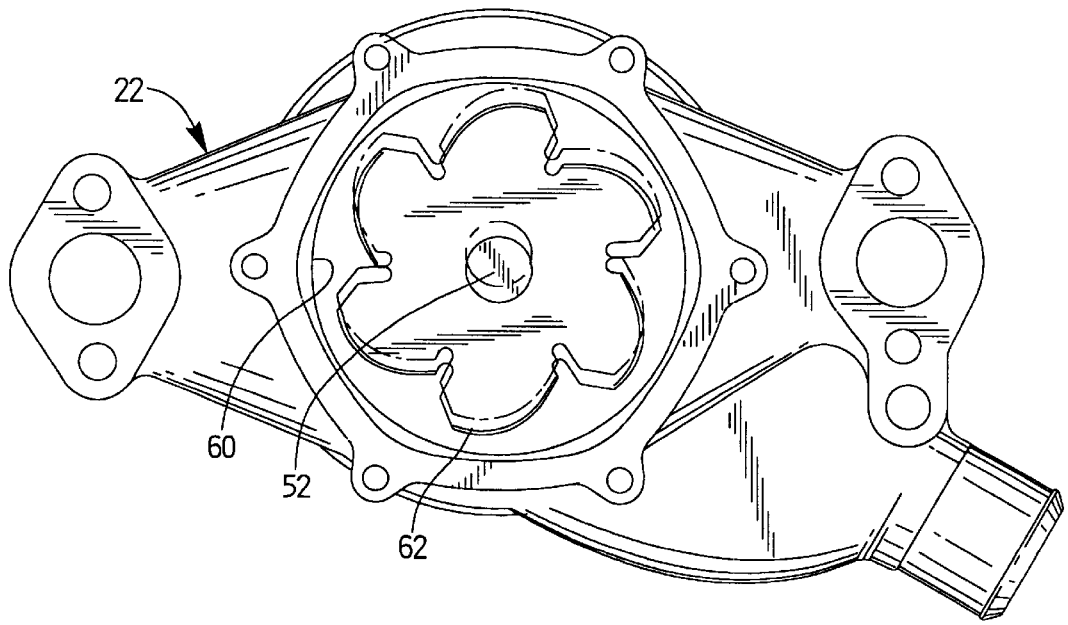
FIG_5

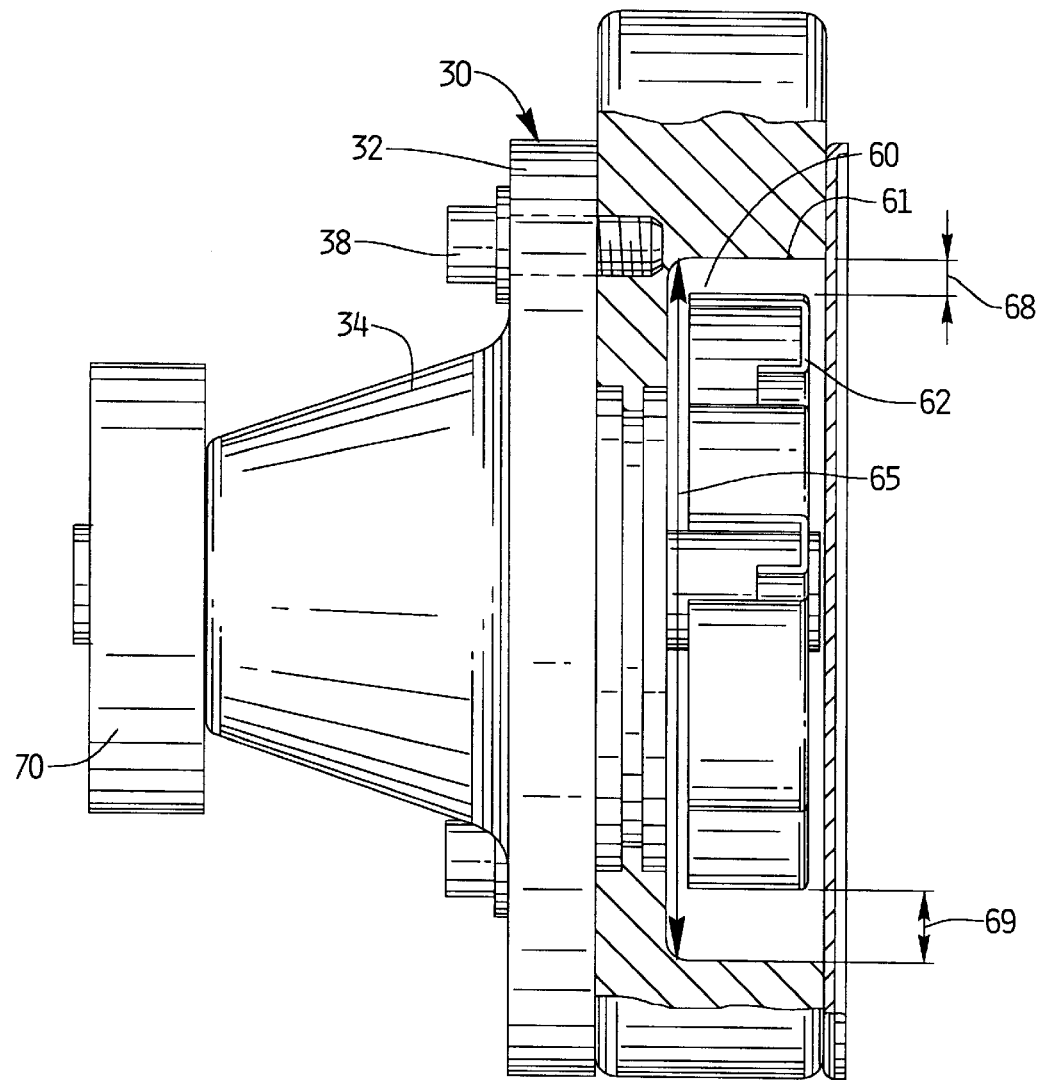
FIG_6

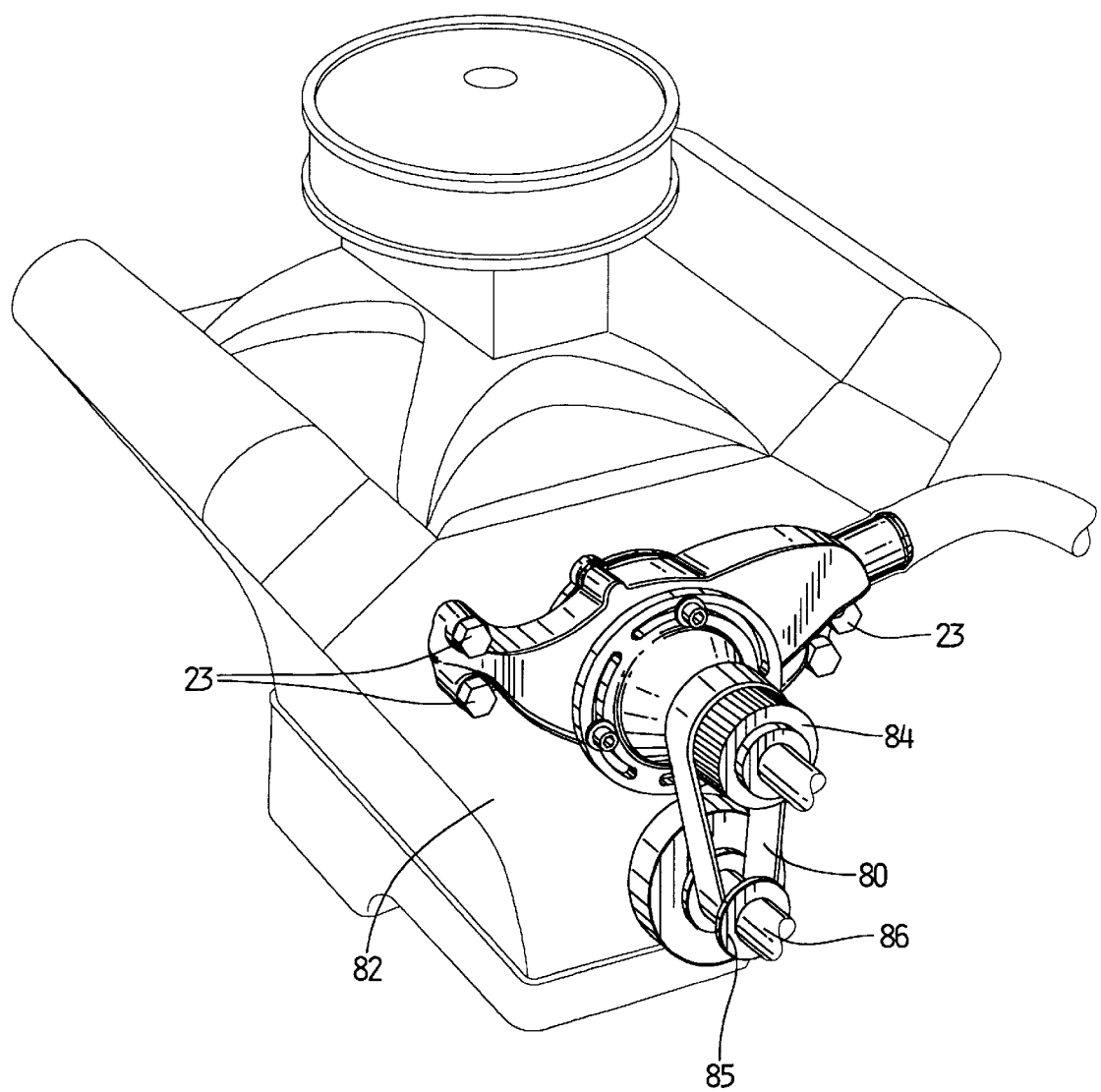

6,146,111

AUTOMOTIVE WATER PUMP

FIELD OF THE INVENTION

This invention relates generally to automotive water pumps and, more particularly, to a water pump wherein the tightness of the drive belt is adjustable by rotating a portion of the pump housing.

BACKGROUND OF THE INVENTION

Motor vehicles include an engine block to which are mounted several belt driven devices. These may include a power steering pump, generator, air conditioning compressor, air pump, and an engine coolant pump, also referred to as a water pump. These devices are powered by a serpentine drive belt which is driven by the crankshaft pulley. The belt wedges neatly into the different pulley grooves, and uses the tension and friction to turn the pulleys attached to the devices. The belt may be subject to significant length change, especially stretch, causing the belt to undesirably loosen with use. The belt-driven accessories may also be removed and remounted in a slightly different position during maintenance causing a slackness in the belt. On the other hand, the belt cannot be too tight or it will put too much pressure on the device bearings and cause them to wear prematurely. As such, proper belt tensioning is very important to the proper functioning of the motor vehicle.

Generally, water pumps have a housing secured to the engine block and a pump shaft rotatably supported by a ball or roller bearing within the pump housing. An impeller is fixed to the inner end of the pump shaft, while the outer end of the pump shaft extends out of the housing and has a pulley fixed thereto. The crankshaft driven belt rotates the pump shaft pulley which in turn drives the pump shaft and impeller.

Because the belt is subject to length change, and because the proper tension is very important, a tensioner is desirable to maintain proper tension in the belt so as to maintain proper frictional contact between the belt and the various pulleys that it engages. Further, in racing vehicles, because of the vigorous driving conditions, the belt will wear and stretch considerably faster. Additionally, the frequency of maintenance, including disassembly and reassembly and dismounting and remounting of the various engine parts, is much greater than that of a conventionally-used vehicle.

Conventionally, belts in a vehicle may be adjusted by loosening the support for the alternator and moving it back and forth to tighten or loosen the belt. A typical adjustment procedure for this method is to first loosen the adjustment fastener on the slotted alternator support. Then, a pry bar must be wedged between a strong part of the engine and the alternator. One must then pull on the pry bar to move the alternator housing in a direction and tighten the belt. Lastly, the adjustment is rechecked. Other systems use a spring-mounted idler pulley to provide tensioning.

Thus, the adjustment of the belt is a difficult, cumbersome, and often time consuming task. For conventionally-used vehicles, the inability to quickly and easily adjust the tension of the belt is not of critical importance. However, with racing vehicles, the time and effort required to adjust the belt is very important because of the frequency of adjustments required and the time pressures of a pitstop. Thus, a device which allows quick and easy adjustment of the tension of the drive belt is desirable.

Also, the current mechanisms used for the adjustment of the drive belt may hinder other maintenance work on the engine. For conventionally-used vehicles, the extra time for maintenance because of this is not so important. However, with the frequency of maintenance repair work to racing vehicles, this time and effort is of great importance. Thus, a device which further eases maintenance to the vehicle is highly desirable.

One additional method of belt tensioning that is currently used, particularly in racing vehicles, where there is typically a separate belt for the alternator from the water pump, is moving the entire water pump to adjust the tension of the drive belt. In such a device, the water pump's mounting holes which attach to the engine block are elongated to allow for the repositioning of the water pump to adjust the tension of the drive belt. However, the readjustment of the water pump is clumsy because of having to move the entire water pump. Furthermore, frequent repositioning of the gaskets which are placed between the water pump housing and the engine block leads to leakage from the gaskets.

Accordingly, a need exists for a drive belt tensioning mechanism that allows quick and easy adjustment of the drive belt, that does not hinder or slow down further maintenance to the vehicle, that is cost effective, and one that is easily installed and operated.

OBJECTS AND SUMMARY OF THE INVENTION

Therefore, it is an object of the present invention to provide a drive belt tensioning mechanism that simplifies maintenance to the vehicle. It is an additional object of the present invention to provide a drive belt tensioning mechanism that allows for quick and easy adjustment of the drive belt. It is yet another object of the invention to provide a device wherein simple adjustment of the water pump results in adjustment of the drive belt. It is a further object of the present invention to provide a drive belt tensioning mechanism that overcomes the disadvantages of the prior art.

The present invention satisfies this need by providing an improved automotive water pump wherein the tightness of the drive belt is adjustable by rotating a portion of the pump housing. A support member connected to the pump housing has a pump shaft extending therethrough. The support member includes a flange in which eccentrically-shaped mounting grooves are located. The adjustment screws which secure the support member to the pump housing pass through the mounting grooves in the flange. Thus, by rotating the support member as guided by its eccentrically-shaped mounting grooves, the location of the support member is re-oriented with respect to the pump housing. The location of the pump shaft extending therethrough is also re-oriented. The engine cooling fan and the shaft around which the drive belt passes is attached to the disk located at the end of the pump shaft. The disk re-orientates with the movement of the pump shaft, thereby adjusting the tension of the drive belt. When such an adjustment is made, the impeller blades move within the housing and sufficient clearance space must be provided within the interior of the pump housing to allow for such re-orientation.

In use, the present invention water pump attaches to the engine block through its mounting holes, as is conventional. When the drive belt needs adjusting, the adjustment screws located in the eccentrically-shaped mounting grooves of the flange of the support member are loosened, and the support member is rotated to adjust the location of the shaft around which the belt passes. This rotation adjusts the tension of the belt and the adjustment screws are then retightened to secure the support member and shaft in place.

While the preferred embodiment of the present invention uses the water pump to adjust the tension in the belt, it should be noted that the present invention could be adapted for use on other belt-driven accessories, so as to effectuate the objective of adjusting the drive belt. Furthermore, while the present invention is particularly advantageous to use in racing vehicles, it is also advantageous for use in conventionally-used vehicles.

In sum, the present invention represents a significant improvement over the prior art in many ways. The water pump in accordance with the present invention allows for quick and easy drive belt tensioning, simplifies maintenance to the vehicle by elimination of excess parts, and overcomes the disadvantages of the prior art. These and other objects and advantages of the present invention will become apparent from the detailed description and accompanying drawings.

BRIEF DESCRIPTION OF THE DRAWINGS

FIG. 1 is a perspective view of an automotive water pump in accordance with the present invention;

FIG. 2 is a front elevational view of the automotive water pump shown in FIG. 1, with the impeller blade within the housing shown in phantom;

FIG. 3 is a partial cross-sectional view of the automotive water pump of FIG. 2 taken generally along the line 3—3;

FIG. 4 is a front elevational view of the automotive water pump of FIG. 2, with the support member rotated to reposition the pump shaft;

FIG. 5 is a rear elevational view of the automotive water pump shown in FIG. 4, with the movement of the impeller blade shown in phantom;

FIG. 6 is a partial cross-sectional view of the automotive water pump in FIG. 3, with the impeller blade shown after repositioning; and FIG. 7 is a perspective view of an automotive water pump in accordance with one embodiment of the present invention shown mounted to an engine block depicted in phantom.

DETAILED DESCRIPTION

Referring now to FIG. 1, the present invention is an improved automotive water pump (identified generally as 20) wherein the tightness of the drive belt (80 in FIG. 7) is adjustable by rotation of a support member 30 mounted to the principal housing 22. Typically the principal housing 22 of the water pump 20 is mounted to the engine block (82 in FIG. 7) using four mounting bolts 23 through mounting holes 24 built into the principal housing 22.

The central portion of the principal housing 22 contains an impeller cavity 60 (FIG. 5). The impeller cavity 60 houses the impeller blades 62, and allows re-orientation of the impeller blades 62 by providing clearance spaces 66–69 (FIGS. 3 and 6) as more fully discussed below. The support member 30 is mounted to the principal housing 22 over the impeller cavity 60. A thin gasket, or the like, (not shown) may be inserted between the support member 30 and the principal housing 22 to help form a tight seal and prevent leakage. The support member 30 generally consists of a disc-shaped flange 32 and a frusto-conical shaped pump shaft housing 34 extending from the flange 32. The support member 30 has multiple eccentrically-shaped mounting grooves 36 located in its flange 32, and extending through the flange 32. The support member 30 is generally secured to the principal housing 22 by adjustment screws 38 positioned in the mounting grooves 36.

As best seen in FIG. 2, the mounting grooves 36 each contain a first end 37 and a second end 39. The first end 37 of each mounting groove 36 is positioned a radial distance 44 from the center point 57 of the pump shaft 52. The second end 39 of each mounting groove 36 is positioned a radial distance 46 from the center point 57 of the pump shaft 52. The mounting grooves 36 are eccentric because the radial distance 44 of the first end 37 is less than the radial distance 46 of the second end 39. Therefore, when the adjustment screws 38 are located at the first end 37 of the mounting grooves 36, the pump shaft 52 is in a first position. When the support member 30 is rotated so that the adjustment screws 38 are located at the second end 39 of the mounting grooves 36, the pump shaft 52 is in a re-oriented position.

As shown in FIG. 3, pump shaft 52 generally extends through the principal housing 22 and the pump shaft housing 34 of the support member 30. A bearing is preferably located within the pump shaft housing 34 for rotatable support of the pump shaft 52 therein. The inner end 54 of the pump shaft 52 extends within the principal housing 22 to the impeller cavity 60 and has impeller blades 62 fixed thereto. The impeller blades 62 are mounted to the inner end 54 of the pump shaft 52. The impeller blades 62 are located within the impeller cavity 60, which, as discussed below, must provide sufficient clearance space 66–69 (FIGS. 3 and 6) for the re-orientation of the impeller blades 62.

The outer end 56 of the pump shaft 52 extends from the pump shaft housing 34 of the support member 30. The outer end 56 of the pump shaft 52 has a disk 70 attached thereto on which a hub of an engine cooling fan (not shown) and the pulley 84 around which the drive belt 80 passes may be mounted. The drive belt 80 wraps around the pully 84 and around a disk member 85 attached to an engine drive shaft 86. The engine drive shaft 86 provides the means for driving the pump 20.

To rotate the support member 30, the adjustment screws 38 through the eccentrically-shaped mounting grooves 36 of the flange 32 are loosened enough to allow rotation of the support member 30 in either a clockwise or counterclockwise direction. The support member 30 can then be rotated as required to adjust the tension of the drive belt. The adjustment screws 38 are then retightened to resecure the support member 30 tightly in place against the principal housing 22. Rotation of the support member 30 causes the pump shaft 52 mounted within the support member's 30 pump shaft housing 34 to correspondingly re-orientate. With the relocation of the pump shaft 52, the disk 70 attached to the outer end 56 of the pump shaft 52 also re-orientates, thereby also re-orientating the pulley 84 around which the drive pelt passes. As such, by rotation of the support member 30, the location of the pump shaft 52 is re-oriented, and this re-orientation of the pump shaft 52 thereby adjusts the tension of the drive belt 80.

Of course, when such an adjustment is made, the impeller blades 62 located at the inner end 54 of the pump shaft 52 also re-orientate within the impeller cavity 60. Since the mounting grooves 36 are eccentrically shaped, when the impeller blades 62 are re-orientated along with the pump shaft 52, the impeller blades 62 will necessarily relocate their position inside the impeller cavity 60. Therefore, it must be certain that when the impeller blades 62 re-orientate, there is sufficient clearance space 66–69 (FIGS. 3 and 6) provided within the interior of the impeller cavity 60 to allow for such movement of the impeller blades 62.

As shown in FIG. 3, the impeller blades 62 are located at the rearward side of the impeller cavity 60. The impeller cavity 60 is a generally cylindrical-shaped cavity in the principal housing 22. When shown in the partial cross-section of FIG. 3, the impeller cavity 60 has diameter 65, top wall 61 and bottom wall 63. Upon re-orientation of the pump shaft 52 within the principal housing 22, the attached impeller blades 62 will re-orientate within the impeller cavity 60 because of the eccentricity of the mounting grooves 36 (FIG. 2). Upon this movement, because the diameter 65 of the impeller cavity 60 is sufficiently large, the impeller blades 62 have sufficient clearance space 66–69 (FIGS. 3 and 6) for such movement.

This re-orientation, caused by the eccentric shape of the mounting grooves 36 in the support member 30, is shown in the drawings. FIG. 2 shows the support member 30 and the impeller blades 62 (shown in phantom) in a first position. In FIG. 3, the impeller blades 62 are in the first position and there is sufficient clearance space 66 between the top wall 61 of the impeller cavity 60 and the impeller blade 62 and sufficient clearance space 67 between the bottom wall 63 of the impeller cavity 60 and the impeller blade 62. In FIG. 4, the support member 30 is rotated clockwise, as indicated by arrows 42, to adjust the tension of the drive belt 80. The eccentric shape of the mounting grooves 36 thereby re-orientates the position of the support member 30 with respect to the principal housing 22 and impeller cavity 60 (FIG. 5). Therefore, the pump shaft 52 also is re-oriented, as shown by the phantom lines. As seen from the rear of the water pump 20 in FIG. 5, the impeller blades 62 are re-orientated correspondingly to the pump shaft 52. As the position of the impeller blades 62 is relocated, as shown by the phantom lines, there must be sufficient space allowed by the impeller cavity 60 for such re-location of the impeller blades 62. FIG. 6, similar to FIG. 3, illustrates the movement of the impeller blades 62 within the impeller cavity 60. Resulting clearance spaces 68 and 69 are altered from previous clearance spaces 66 and 67 (FIG. 3) because of the movement of the impeller blades 62 within the walls of the impeller cavity 60. The impeller blades 62 have re-orientated upwards in the impeller cavity 60, thus causing clearance space 68 to reduce in size as compared to clearance space 66, and clearance space 69 to increase in size as compared to clearance space 67. The impeller cavity 60 must be dimensioned large enough to accommodate this movement of the impeller blades 62.

In use, the water pump 20 of the present invention attaches and detaches to the engine block 82 through its mounting holes 24, as is conventional. Then, when it is necessary to adjust the tension of the drive belt 80, the support member 30 can simply be rotated. First, the adjustment screws 38, located in the eccentrically-shaped mounting grooves 36 of the support member 30 and securing the support member 30 in place against the principal housing 22, are loosened enough to allow free rotation of the support member 30 in either a clockwise or counterclockwise direction. The support member 30 is then rotated to its desired location, thereby re-orientating the location of the pump shaft 52 and adjusting the tension of the drive belt 80. The adjustment screws 38 are then be retightened to secure the support member 30 and the pump shaft 52 in place.

Although the invention has been herein shown and described in what is perceived to be the most practical and preferred embodiments, it is to be understood that the invention is not intended to be limited to those specific embodiments. Rather, it is recognized that modifications may be made by one of skill in the art without departing from the spirit or intent of the invention. Therefore, the invention is to be taken as including all reasonable equivalents to the subject matter of the appended claims.

I claim:

1. A water pump comprising:
   a principal housing;
   a support member, having a plurality of mounting grooves, mounted on the principal housing, the support member rotatable with respect to the principal housing;
   a pump shaft extending through the support member, the plurality of grooves being eccentrically spaced from a center point of said pump shaft; and
   a drive belt having a tension disposed about the pump shaft and connecting the pump shaft to a driving means, the support member eccentrically mounted on the principal housing such that rotation of the support member causes change in the position of the pump shaft and adjustment to the tension in the drive belt.

2. The water pump of claim 1 wherein rotation of the support member causes a repositioning of the pump shaft.

3. The water pump of claim 2 wherein the support member further comprises a pump shaft housing with a flange extending therefrom.

4. The water pump of claim 3 further comprising adjustment screws disposed through the mounting grooves so as to secure the support member to the principal housing.

5. The water pump of claim 4 wherein the principal housing includes an impeller cavity therein.

6. The water pump of claim 5 wherein the pump shaft has a first end and a second end, the first end having impeller blades secured thereto and the second end extending outward through the support member.

7. The water pump of claim 6 wherein the impeller cavity includes clearance space so as to allow repositioning of the impeller blades upon rotation of the support member.

8. A belt tensioning apparatus comprising:
   a principal housing;
   a support member, having a plurality of mounting grooves, mounted on the principal housing, the support member rotatable with respect to the principal housing;
   a drive shaft extending through the support member, the plurality of grooves being eccentrically spaced from a center point of said drive shaft; and
   a belt having a tension disposed about the drive shaft and connecting the drive shaft to a driving means, the support member eccentrically mounted on the principal housing such that rotation of the support member causes change in the position of the drive shaft and adjustment to the tension in the belt.

9. The belt tensioning apparatus of claim 8 wherein rotation of the support member causes a repositioning of the drive shaft.

10. The belt tensioning apparatus of claim 9 wherein the support member further comprises a drive shaft housing with a flange extending therefrom.

11. The belt tensioning apparatus of claim 10 further comprising adjustment screws disposed through the mounting grooves so as to secure the support member to the principal housing.

12. The belt tensioning apparatus of claim 11 wherein the principal housing includes an impeller cavity therein.

13. The belt tensioning apparatus of claim 12 wherein the drive shaft has a first end and a second end, the first end having impeller blades secured thereto and the second end extending outward through the support member.

14. The belt tensioning apparatus of claim 13 wherein the impeller cavity includes clearance space so as to allow repositioning of the impeller blades upon rotation of the support member.

15. A water pump for use in a vehicle, the water pump comprising:

a principal housing having an impeller cavity therewithin;

a plurality of mounting bolts securing the principal housing to the vehicle;

a support member having a pump shaft housing with a flange extending therefrom, the flange including a plurality of eccentrically-shaped mounting grooves;

a plurality of adjustment screws extending through the mounting grooves of the flange so as to mount the support member to the principal housing such that it is rotatable;

a pump shaft disposed through the support member, the plurality of eccentrically-shaped mounting grooves being eccentrically spaced from a center point of said pump shaft, the pump shaft having a first end and a second end, the first end having impeller blades secured thereto and the second end extending outward through the support member; and a drive belt disposed about the pump shaft and connecting the pump shaft to a driving means.

\* \* \* \* \*